US012665676B2

(12) United States Patent
Tatarczak

(10) Patent No.: US 12,665,676 B2
(45) Date of Patent: Jun. 23, 2026

(54) SYSTEM AND METHOD FOR COHERENT RECEIVERS WITH PCSELS EMITTING IN TWO DIRECTIONS

(71) Applicant: II-VI Delaware, Inc., Wilmington, DE (US)

(72) Inventor: Anna Tatarczak, Wilmington, DE (US)

(73) Assignee: II-VI DELAWARE, INC., Wilmington, DE (US)

( * ) Notice: Subject to any disclaimer, the term of this patent is extended or adjusted under 35 U.S.C. 154(b) by 281 days.

(21) Appl. No.: 18/608,729

(22) Filed: Mar. 18, 2024

(65) Prior Publication Data

US 2025/0293782 A1 Sep. 18, 2025

(51) Int. Cl.
*H04B 10/00* (2013.01)
*H04B 10/61* (2013.01)
*H04J 14/00* (2006.01)

(52) U.S. Cl.
CPC ......... *H04B 10/614* (2013.01); *H04B 10/616* (2013.01)

(58) Field of Classification Search
CPC .............................. H04B 10/614; H04J 14/06
See application file for complete search history.

(56) References Cited

U.S. PATENT DOCUMENTS

| | | | |
|---|---|---|---|
| 10,944,482 B2 | 3/2021 | Younce et al. | |
| 2016/0285561 A1* | 9/2016 | Wu ...................... | H04B 10/613 |
| 2020/0186257 A1* | 6/2020 | Jensen ................... | H04B 10/54 |
| 2021/0080245 A1 | 3/2021 | Mutlu et al. | |
| 2022/0109504 A1* | 4/2022 | Sakai ................... | H04B 10/272 |

OTHER PUBLICATIONS

Extended European Search Report for Application No. 25160880, completed Jul. 14, 2025, 11 pages.
Zhou Weidong et al., "The Future of Photonic Crystal Surface-Emitting Lasers", Applied Sciences Letters, American Institute of Physics, vol. 123, No. 14, Oct. 4, 2023.
Pan Mingsen et al, "Recent Advances in Photonic Crystal Surface Emitting Lasers", IEEE Journal of Selected Topics in Quantum Electronics, vol. 31, No. 2, Oct. 15, 2024, pp. 1-8.
Itoh Yuhki et al, "High-Power and High-Efficiency Operation of 1.3 M-Wavelength InP-based Photonic-Crystal Surface-Emitting Lasers with Metal Reflectors", Optics Express, vol. 32, No. 7, Mar. 19, 2024., p. 12520.

* cited by examiner

*Primary Examiner* — Daniel G Dobson
(74) *Attorney, Agent, or Firm* — McAndrews, Held & Malloy, Ltd.

(57) ABSTRACT

Embodiments of the present disclosure may comprise a coherent optical receiver, where the coherent optical receiver comprises a PCSEL that generates a first and a second light beam. In accordance with various embodiments, the physical emission direction of the first light beam may be at an angle of 180 degrees, or 180 degrees plus/minus 10 degrees in some instances, to the physical emission direction of the second light beam. Embodiments may also comprise a first hybrid receiver that receives a first portion of an input light signal to the coherent optical receiver and the first light beam as a local oscillator signal, generating one or more first optical hybrid receiver output signals. Embodiments may also comprise a second hybrid receiver that receives a second portion of the input light signal to the coherent optical receiver and the second light beam as a local oscillator signal, generating one or more second optical hybrid receiver output signals.

20 Claims, 3 Drawing Sheets

SYSTEM AND METHOD FOR COHERENT RECEIVERS WITH PCSELS EMITTING IN TWO DIRECTIONS

TECHNICAL FIELD

The present disclosure generally relates to coherent receivers with PCSELs emitting in two directions.

BACKGROUND

Aspects of the present disclosure relate to coherent receivers with PCSELs emitting in two directions. Various issues may exist with conventional solutions for coherent receivers. In this regard, conventional systems and methods for coherent receivers may be costly, cumbersome, and/or inefficient.

Limitations and disadvantages of conventional systems and methods will become apparent to one of skill in the art, through comparison of such approaches with some aspects of the present methods and systems set forth in the remainder of this disclosure with reference to the drawings.

BRIEF SUMMARY OF THE DISCLOSURE

Shown in and/or described in connection with at least one of the figures, and set forth more completely in the claims are coherent receivers with PCSELs emitting in two directions.

These and other advantages, aspects and novel features of the present disclosure, as well as details of illustrated embodiments thereof, will be more fully understood from the following description and drawings.

BRIEF DESCRIPTION OF THE DRAWINGS

The various features and advantages of the present disclosure may be more readily understood with reference to the following detailed description taken in conjunction with the accompanying drawings, wherein like reference numerals designate like structural elements.

DESCRIPTION

Figure 1:
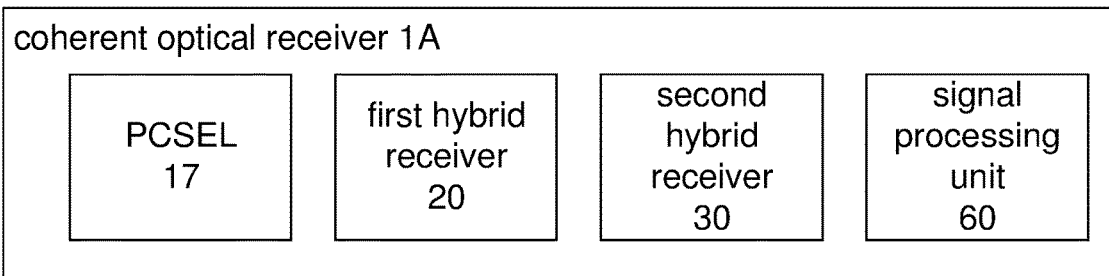
FIG. 1 is a block diagram illustrating a coherent optical receiver, according to some embodiments of the present disclosure.

The following discussion provides various examples of semiconductor devices and methods of manufacturing semiconductor devices. Such examples are non-limiting, and the scope of the appended claims should not be limited to the particular examples disclosed. In the following discussion, the terms "example" and "e.g." are non-limiting.

The figures illustrate the general manner of construction, and descriptions and details of well-known features and techniques may be omitted to avoid unnecessarily obscuring the present disclosure. In addition, elements in the drawing figures are not necessarily drawn to scale. For example, the dimensions of some of the elements in the figures may be exaggerated relative to other elements to help improve understanding of the examples discussed in the present disclosure. The same reference numerals in different figures denote the same elements.

The term "or" means any one or more of the items in the list joined by "or". As an example, "x or y" means any element of the three-element set $\{(x), (y), (x, y)\}$. As another example, "x, y, or z" means any element of the seven-element set $\{(x), (y), (z), (x, y), (x, z), (y, z), (x, y, z)\}$.

The terms "comprises," "comprising," "includes," and/or "including," are "open ended" terms and specify the presence of stated features, but do not preclude the presence or addition of one or more other features.

The terms "first," "second," etc. may be used herein to describe various elements, and these elements should not be limited by these terms. These terms are only used to distinguish one element from another. Thus, for example, a first element discussed in this disclosure could be termed a second element without departing from the teachings of the present disclosure.

Unless specified otherwise, the term "coupled" may be used to describe two elements directly contacting each other or describe two elements indirectly connected by one or more other elements. For example, if element A is coupled to element B, then element A can be directly contacting element B or indirectly connected to element B by an intervening element C. Similarly, the terms "over" or "on" may be used to describe two elements directly contacting each other or describe two elements indirectly connected by one or more other elements.

Embodiments of the present disclosure may comprise a coherent optical receiver, the coherent optical receiver comprising a PCSEL generating a first and a second light beam. In accordance with various embodiments, the physical emission direction of the first light beam may be at an angle of 180 degrees, or 180 degrees plus/minus 10 degrees in some instances, to the physical emission direction of the second light beam.

Embodiments may also comprise a first hybrid receiver receiving a first portion of an input light signal to the coherent optical receiver and the first light beam as a local oscillator signal, generating one or more first optical hybrid receiver output signals. Embodiments may also comprise a second hybrid receiver receiving a second portion of the input light signal to the coherent optical receiver and the second light beam as a local oscillator signal, generating one or more second optical hybrid receiver output signals. Embodiments may also comprise a signal processing unit operable to convert the first optical hybrid receiver output signals and/or the second optical hybrid receiver output signals to electrical signals.

In accordance with various embodiments, the received first light beam may be rotated and/or polarized with respect to the input light signal. In accordance with various embodiments, the received second light beam may be rotated and/or polarized with respect to the input light signal. In accordance with various embodiments, the angle between the first light beam and the second light beam may be substantially 180 degrees.

In accordance with various embodiments, the coherent optical receiver may comprise one or more polarizers and/or rotators. Embodiments may also comprise either or both of the received first portion of the input light signal or the received second portion of the input light signal may be rotated and/or polarized with respect to the first light beam or the second light beam generated at the PCSEL.

Throughout this description, the terms "polarizer" and "rotator" will be used interchangeably, as will the similar verbs "polarize" and "rotate." Both terms are indicative of modifying or adjusting the polarization state of some light signal, aligning or matching the polarization of two light beams, and/or changing the orientation of the polarization state of some light signal.

In accordance with various embodiments, the signal processing unit may comprise one or more analog-to-digital converters. In accordance with various embodiments, the signal processing unit may comprise a digital signal processor. In accordance with various embodiments, the electrical signals may be digitized. In accordance with various embodiments, the electrical signals represent information extracted from the input light.

Embodiments of the present disclosure may also comprise a method for coherent optical receiving, the method comprising generating a first and a second light beam using a PCSEL. In accordance with various embodiments, the physical emission direction of the first light beam may be at an angle of 180 degrees, or 180 degrees plus/minus 10 degrees in some instances, to the physical emission direction of the second light beam.

Embodiments may also comprise receiving at a first hybrid receiver a first portion of an input light signal and the first light beam as a local oscillator signal, generating one or more first optical hybrid receiver output signals. Embodiments may also comprise receiving at a second hybrid receiver a second portion of the input light signal and the second light beam as a local oscillator signal, generating one or more second optical hybrid receiver output signals. Embodiments may also comprise converting the first optical hybrid receiver output signals and/or the second optical hybrid receiver output signals to electrical signals at a signal processing unit.

In accordance with various embodiments, the method may comprise rotating and/or polarizing the received first portion of the input light signal with respect to the input light signal. In accordance with various embodiments, the method, comprising rotating and/or polarizing the received second portion of the input light signal with respect to the input light signal.

In accordance with various embodiments, the angle between a first light beam and a second light beam generated at a PCSEL may be substantially 180 degrees, or 180 degrees plus/minus 10 degrees in some instances. In accordance with various embodiments, the method may comprise polarizing and/or rotating one or more optical beams. In accordance with various embodiments, the method may comprise rotating and/or polarizing the received light beam and/or the received second light beam with respect to the first light beam or the second light beam generated at the PCSEL.

In accordance with various embodiments, the method may comprise analog-to-digital converting in the signal processing unit. In accordance with various embodiments, the method may comprise digital signal processing in the signal processing unit. In accordance with various embodiments, the method may comprise digitizing the electrical signals. In accordance with various embodiments, the method may comprise extracting information from the input light and representing the information in the electrical signals.

Referring now to FIG. 1, FIG. 1 is a block diagram that describes a coherent optical receiver 1A, according to some embodiments of the present disclosure. In some embodiments, the coherent optical receiver 1A may include a PCSEL 17 generating a first and a second light beam and a signal processing unit 60 operable to convert the first optical hybrid receiver 20 output signals and/or the second optical hybrid receiver 30 output signals to electrical signals. The coherent optical receiver 1A may also include a first hybrid receiver 20 receiving a first portion of an input light signal at the coherent optical receiver 1A and the first light beam as a local oscillator signal, generating one or more first optical hybrid receiver output signals. The coherent optical receiver 1A may also include a second hybrid receiver 30 receiving a second portion of the input light signal at the coherent optical receiver 1A and the second light beam as a local oscillator signal, generating one or more second optical hybrid receiver output signals. The physical emission direction of the first light beam may be at an angle of 180 degrees, or 180 degrees plus/minus 10 degrees in some instances, to the physical emission direction of the second light beam.

In some embodiments, the received first portion of the input light signal may be rotated and/or polarized with respect to the input light signal. In some embodiments, the received second portion of the input light signal may be rotated and/or polarized with respect to the input light signal. In some embodiments, the angle may be substantially 180 degrees. In some embodiments, either or both of the received first portion of the input light signal or the received second portion of the input light signal may be rotated and/or polarized with respect to the first light beam or the second light beam generated at the PCSEL 17. In some embodiments, the signal processing unit 60 comprises one or more analog-to-digital converters. In some embodiments, the signal processing unit 60 may include a digital signal processor. In some embodiments, the electrical signals may be digitized. In some embodiments, the electrical signals may represent information extracted from the input light.

Figure 2:
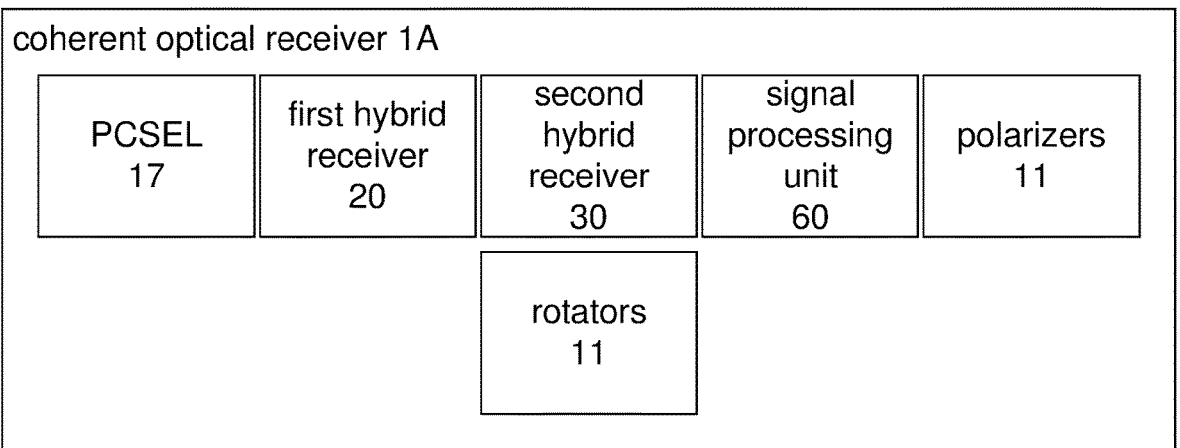
FIG. 2 is a block diagram further illustrating the coherent optical receiver from FIG. 1, according to some embodiments of the present disclosure.

FIG. 2 is a block diagram that further describes the coherent optical receiver 1A from FIG. 1, according to some embodiments of the present disclosure. In some embodiments, the coherent optical receiver 1A may include one or more polarizers 11 and/or rotators 11.

Figure 3:
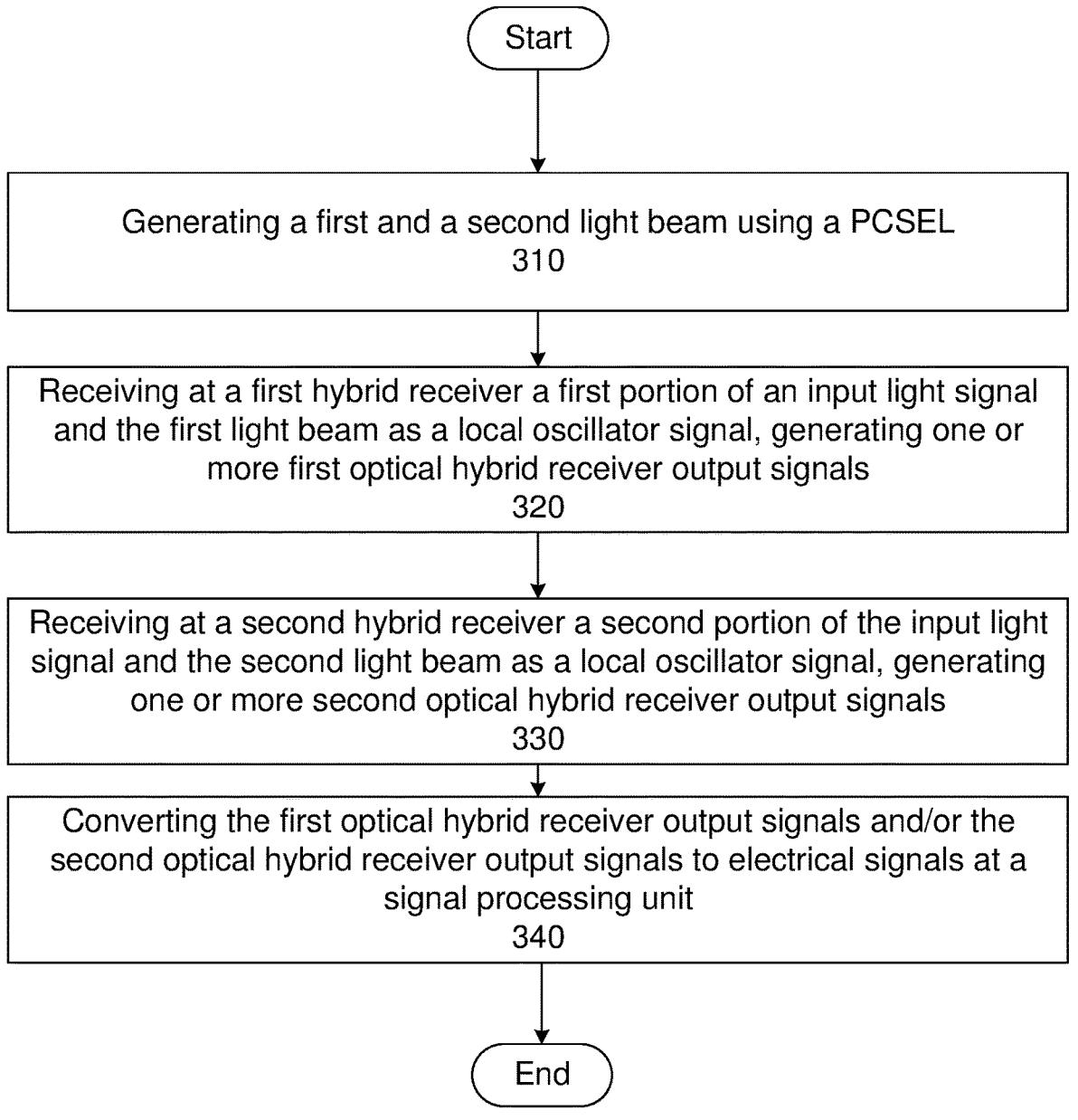
FIG. 3 is a flowchart illustrating a method, according to some embodiments of the present disclosure.

FIG. 3 is a flowchart that describes a method, according to some embodiments of the present disclosure. In some embodiments, at 310, the method may include generating a first and a second light beam using a PCSEL. At 320, the method may include receiving at a first hybrid receiver a first portion of an input light signal and the first light beam as a local oscillator signal, generating one or more first optical hybrid receiver output signals. At 330, the method may include receiving at a second hybrid receiver a second portion of the input light signal and the second light beam as a local oscillator signal, generating one or more second optical hybrid receiver output signals. At 340, the method may include converting the first optical hybrid receiver output signals and/or the second optical hybrid receiver output signals to electrical signals at a signal processing unit. The physical emission direction of the first light beam may be at an angle of 180 degrees, or 180 degrees plus/minus 10 degrees in some instances, to the physical emission direction of the second light beam.

In some embodiments, the method may include rotating and/or polarizing the received first portion of the input light signal with respect to the input light signal. In some embodiments, the method may comprise rotating and/or polarizing the received second portion of the input light signal with respect to the input light signal. In some embodiments, the angle may be substantially 180 degrees. In some embodiments, the method may include polarizing and/or rotating one or more optical beams.

In some embodiments, the method may include rotating and/or polarizing the received first portion of the input light signal and/or the received second portion of the input light signal with respect to the first light beam or the second light beam generated at the PCSEL. In some embodiments, analog-to-digital converting may be operable in the signal processing unit. In some embodiments, digital signal processing may be operable in the signal processing unit. In some embodiments, the method may comprise digitizing the electrical signals. In some embodiments, the method may comprise extracting information from the input light and representing the information in the electrical signals.

Figure 4:
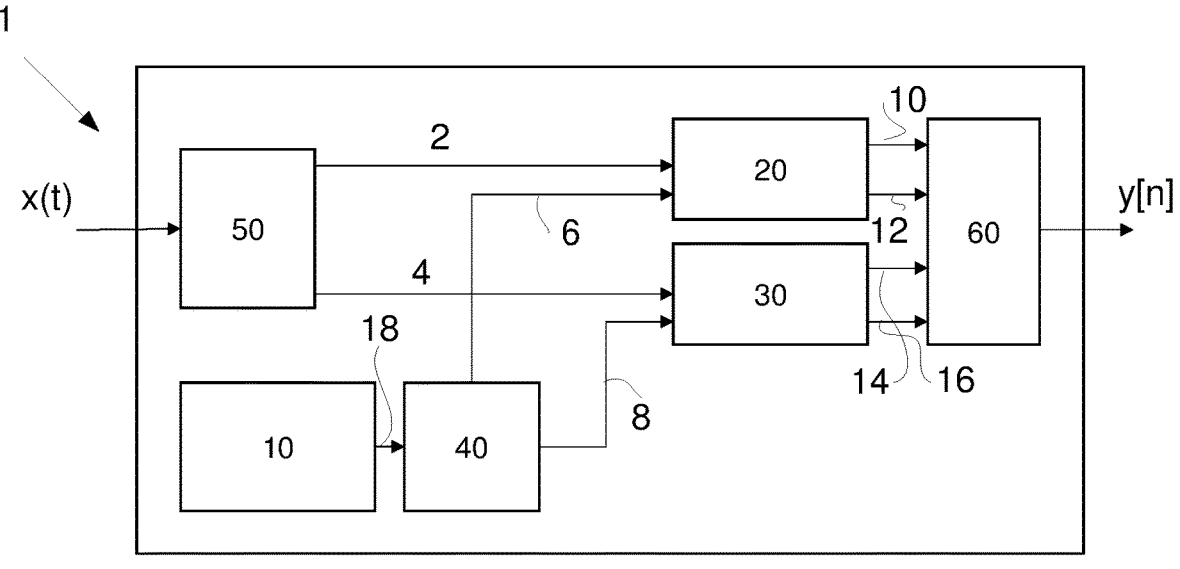
FIG. 4 shows an exemplary coherent optical receiver.

Referring now to FIG. 4, there is shown a coherent receiver 1, receiving an input signal x(t) and generating an output signal y[n]. The coherent receiver 1 may comprise a polarization beam splitter (PBS) 50, a local oscillator 10, a beam splitter (BS) 40, an X hybrid receiver 20, a Y hybrid receiver 30, and a signal processing unit 60. The input signal x(t) may be an information-bearing signal.

For example, x(t) may be amplitude modulated, frequency modulated, or phase modulated. For example, x(t) may be a quadrature amplitude modulated signal (QAM) or a phase shift keying modulated signal (PSK). The output signal y[n] may be the output signal of the coherent receiver 1. A coherent optical receiver 1 may be used in fiber optical communication systems to detect the information signal from modulated light. Its primary function may be to convert the phase and amplitude information of the input signal x(t) into an electrical form y[n] that may be processed by electronic equipment. A coherent receiver 1 may be used in high-speed data transmissions, for example.

The PBS 50 may be operable to split the input signal x(t) into an X signal light component 2 and a Y signal light component 4. The X component 4 may also be referred to as the horizontal polarization component, for example. The Y component 4 may also be referred to as the vertical polarization component, for example. The X component 2 may be orthogonal to the Y component 4, that is, the X component 2 may be polarized differently from the Y component 4. Generally, the X component 2 and the Y component 4 may be orthogonal but the actual orientation of these polarizations may vary. Accordingly, the terms horizontal and vertical are used in a relative sense. The PBS 50 may be operable to manage the polarization of the incoming signal x(t), so that its output signals 2,4 match the polarization of the local oscillator signals 6,8 for mixing in the X hybrid receiver 20 and/or the Y receiver 30. The PBS 50 may generate an output signal that may comprise a rotated part of the input signal to match the polarization of the signal coming from the local oscillator at the hybrid mixer.

The LO 10 may be operable to generate a light beam at a specific frequency, which may be used to mix with the incoming light signal x(t). The frequency of the local oscillator 10 may be close or identical to the frequency of the input signal x(t). The LO 10 may be a laser.

The beam splitter (BS) 40 may be operable to receive a light signal 18 and generate a plurality of output signals 6,8, each comprising a portion of the power of the received light signal. In accordance with various embodiments of the disclosure, the BS 40 may receive a local oscillator signal 18 and split it into a plurality of output signals 6,8 that provide the LO signal to the hybrid receivers 20, 30.

The X hybrid receiver 20 and the Y hybrid receiver 30 may be operable to mix an incoming signal light 2,4 with a light from the local oscillator laser 6,8. This process may create interference between the incoming signal light 2,4 and the local oscillator light 6,8, which may be used to decode phase and amplitude information of the incoming signal light 2,4. For example, the X hybrid receiver 20 may receive the X signal component 2 and the local oscillator signal 6 and generate/detect an in-phase component 10 of the X signal component 2, and a quadrature component 12 of the X signal component 2. Similarly, the Y hybrid receiver 30 may receive the Y signal component 4 and the local oscillator signal 8 and generate/detect an in-phase component 14 of the X signal component 2, and a quadrature component 16 of the X signal component 4.

The signal processing unit 60 may be operable to receive optical light signals 10, 12, 14, 16 and convert them to electrical signals. The signal processing unit 60 may comprise photodetectors. These may be used to convert the mixed optical signals into electrical signals. The output electrical signal of signal processing unit 60 may be discrete and/or analog. For example, y[n] may be digital and processed. Correspondingly, the signal processing unit 60 may comprise, e.g., an analog-to-digital converter and a digital signal processor. The signal processing unit 60 may typically comprise a digital signal processor that may be used to compensate for impairments such as chromatic dispersion and polarization mode dispersion, for example.

Figure 5:
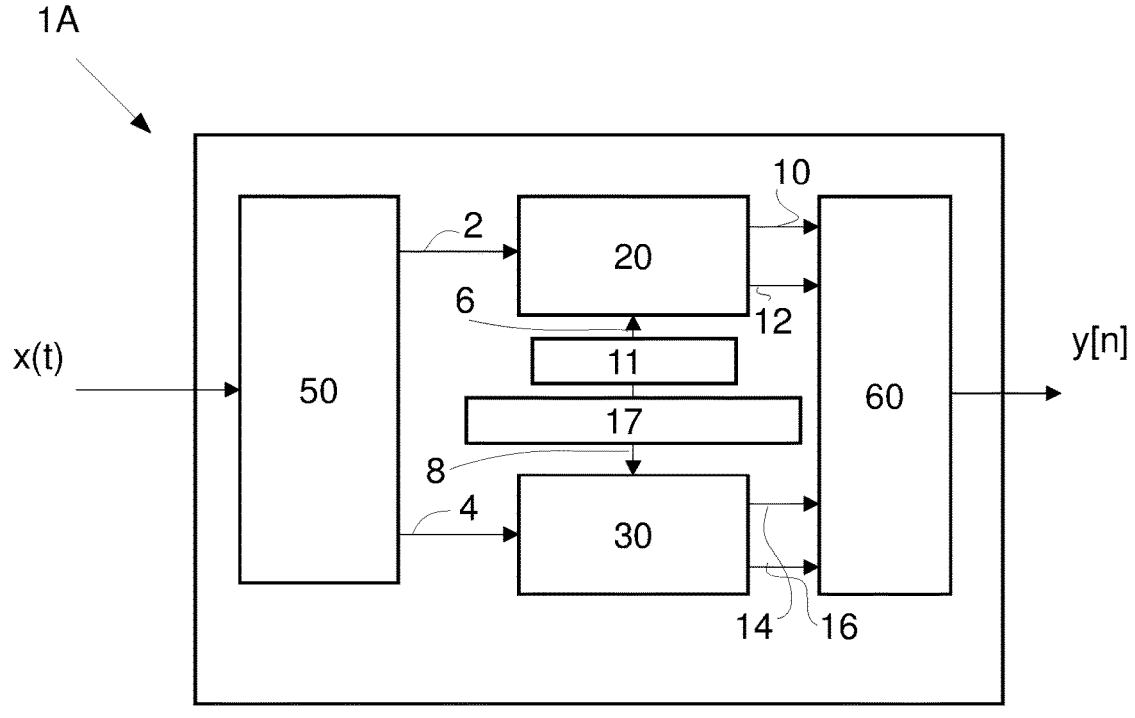
FIG. 5 shows an exemplary coherent optical receiver in accordance with various embodiments of the disclosure.

FIG. 5 shows an exemplary coherent optical receiver 1A in accordance with various embodiments of the disclosure. There is shown a coherent receiver 1A with an input light signal x(t) and an output signal y[n]. There is further shown a PBS 50, and X hybrid receiver 20, a Y hybrid receiver 30, a signal processing unit 60, a PCSEL/PCSEL-based local oscillator 17, and a polarizer/rotator 11. The function of coherent receiver 1A may be similar to coherent receiver 1. However, the LO 10 and the BS 40 may be replaced by PCSEL-based local oscillator 17 and polarizer/rotator 11.

The PCSEL 17 may be a Photonic Crystal Surface Emitting Laser operable as a local oscillator. A PCSEL may be a type of semiconductor laser that may combine the features of a Photonic Crystal Laser (PCL) and a Vertical-Cavity Surface-Emitting laser (VCSEL). A PCSEL may combine many advantages of PCL and VCSEL and achieve high efficiency, high-power output, a good beam quality, and a compact form. PCSEL 17 may be a specialized design that may emit identical light from both the top and bottom surfaces of the semiconductor. Correspondingly, the PCSEL 17 may emit in two physical directions. For this reason, in accordance with various embodiments of the disclosure, it may be unnecessary to use a beams splitter (e.g. BS 40) to generate two light beams. The PCSEL 17 may thus generate a local oscillator light signal and emit it in two physical directions 6,8 that may be coupled to the hybrid receivers 20, 30. In some instances, it may be desirable to polarize or rotate one or more outputs of PCSEL 17 to match the polarization of the X signal component 2 and/or the Y signal component 4, as illustrated with exemplary polarizer/rotator 11. One advantage of such a structure is that it may be implemented in a smaller form factor than a conventional beam splitter, e.g. BS 40. Conventional beam splitters, for example BS 40, may be operable to divide a beam of light into two separate beams. In many instances, a beam splitter may comprise partially reflective glass substrates using desirable ratios of reflection to transmission, i.e. that may act as mirrors partly. When a light beam strikes the surface of the beam splitter, a portion of the light may be reflected at typically a 90° angle, while the remaining portion may be transmitted through the glass. Because the implementation may comprise one or more mirrors in addition to a light source, a conventional beam splitter may be physically larger than a light source directly generating a plurality of light beams.

The present disclosure includes reference to certain examples, however, it will be understood by those skilled in the art that various changes may be made and equivalents may be substituted without departing from the scope of the disclosure. In addition, modifications may be made to the disclosed examples without departing from the scope of the present disclosure. Therefore, it is intended that the present disclosure not be limited to the examples disclosed, but that the disclosure will include all examples falling within the scope of the appended claims.

What is claimed is:

1. A coherent optical receiver, said coherent optical receiver comprising:

a PCSEL generating a first and a second light beam, wherein a physical emission direction of said first light beam is at an angle of approximately 180 degrees to a physical emission direction of said second light beam;

a first hybrid receiver receiving a first portion of an input light signal to said coherent optical receiver and said first light beam as a local oscillator signal, generating one or more first optical hybrid receiver output signals;

a second hybrid receiver receiving a second portion of said input light signal to said coherent optical receiver and said second light beam as a local oscillator signal, generating one or more second optical hybrid receiver output signals; and a signal processing unit operable to convert said first optical hybrid receiver output signals and/or said second optical hybrid receiver output signals to electrical signals.

2. The system of claim 1, wherein said received first light beam is rotated and/or polarized with respect to said input light signal.

3. The system of claim 1, wherein said received second light beam signal is rotated and/or polarized with respect to said input light signal.

4. The system of claim 1, wherein said angle is substantially 180 degrees.

5. The system of claim 1, wherein said coherent optical receiver comprises one or more polarizers and/or rotators.

6. The system of claim 1, wherein either or both of said received first portion of said input light signal or said received second portion of said input light signal is rotated and/or polarized with respect to said first light beam or said second light beam generated at said PCSEL.

7. The system of claim 1, wherein said signal processing unit comprises one or more analog-to-digital converters.

8. The system of claim 1, wherein said signal processing unit comprises a digital signal processor.

9. The system of claim 1, wherein said electrical signals are digitized.

10. The system of claim 1, wherein said electrical signals represent information extracted from said input light.

11. A method for coherent optical receiving, said method comprising:

generating a first and a second light beam using a PCSEL, wherein a physical emission direction of said first light beam is at an angle of approximately 180 degrees to a physical emission direction of said second light beam;

receiving at a first hybrid receiver a first portion of an input light signal and said first light beam as a local oscillator signal, generating one or more first optical hybrid receiver output signals;

receiving at a second hybrid receiver a second portion of said input light signal and said second light beam as a local oscillator signal, generating one or more second optical hybrid receiver output signals; and converting said first optical hybrid receiver output signals and/or said second optical hybrid receiver output signals to electrical signals at a signal processing unit.

12. The method of claim 11, comprising rotating and/or polarizing said received first light beam with respect to said input light signal.

13. The method of claim 11, comprising rotating and/or polarizing said received second light beam with respect to said input light signal.

14. The method of claim 11, wherein said angle is substantially 180 degrees.

15. The method of claim 11, comprising polarizing and/or rotating one or more optical beams.

16. The method of claim 11, comprising rotating and/or polarizing said received first portion of said input light signal and/or said received second portion of said input light signal with respect to said first light beam or said second light beam generated at said PCSEL.

17. The method of claim 11, comprising analog-to-digital converting in said signal processing unit.

18. The method of claim 11, comprising digital signal processing in said signal processing unit.

19. The method of claim 11, comprising digitizing said electrical signals.

20. The method of claim 11, comprising extracting information from said input light and representing said information in said electrical signals.

* * * * *